(12) United States Patent
Tillison

(10) Patent No.: US 11,313,341 B1
(45) Date of Patent: Apr. 26, 2022

(54) PORTABLE RIVER TURBINE SYSTEM

(71) Applicant: Trevor Tillison, Henderson, TX (US)

(72) Inventor: Trevor Tillison, Henderson, TX (US)

( * ) Notice: Subject to any disclaimer, the term of this patent is extended or adjusted under 35 U.S.C. 154(b) by 0 days.

(21) Appl. No.: 17/193,903

(22) Filed: Mar. 5, 2021

(51) Int. Cl.
*F03B 13/10* (2006.01)

(52) U.S. Cl.
CPC .......... *F03B 13/10* (2013.01); *F05D 2220/76* (2013.01); *F05D 2240/90* (2013.01)

(58) Field of Classification Search
CPC ... F03B 13/10; F05D 2240/90; F05D 2220/76
USPC ..................................... 290/43, 54
See application file for complete search history.

(56) References Cited

U.S. PATENT DOCUMENTS

| | | | | |
|---|---|---|---|---|
| 3,209,156 A * | 9/1965 | Struble, Jr. | .......... | H02K 7/1823 290/54 |
| 7,541,688 B2 * | 6/2009 | Mackie | .......... | F03B 13/26 290/54 |
| 2005/0285407 A1 * | 12/2005 | Davis | .......... | F03B 13/083 290/54 |
| 2009/0140524 A1 * | 6/2009 | Kejha | .......... | F03B 13/264 290/54 |
| 2009/0267347 A1 * | 10/2009 | Abatemarco | .......... | F03B 13/10 290/43 |
| 2015/0361949 A1 * | 12/2015 | Kanemoto | .......... | F03B 13/264 290/54 |

* cited by examiner

*Primary Examiner* — Charles Reid, Jr.
(74) *Attorney, Agent, or Firm* — Lyman Moulton, Esq.; Moulton Patents, PLLC

(57) ABSTRACT

The portable river turbine system is a small-scale electricity generator whereby boaters, fishers, or other individual entities can use the current of a river or other body of water to power or charge small electronic devices such as phones, lights, or radios. The detachable propeller or wheel is attached at one end of the waterproof turbine housing. The turbine can be secured by the side bolting, by the vertical hook, or optionally by both. Said vertical hook has a telescopic expandable shaft, allowing for the shaft to be the optimal length to best submerge the turbine wheel or propeller and still attach to a boat, dock, or other surface above the water's level. Stationed on the top of the waterproof turbine housing are quick connections that can be used for wires and handles.

16 Claims, 2 Drawing Sheets

PORTABLE RIVER TURBINE SYSTEM

BACKGROUND

A water turbine is a rotary machine that converts kinetic energy and potential energy of water into mechanical work. Water turbines were developed in the 19th century and were widely used for industrial power prior to electrical grids. Now they are mostly used for electric power generation. Water turbines are mostly found in dams to generate electric power from water potential energy. There have been no products available as original equipment or as an aftermarket to address this problem.

Run-of-the-river hydroelectricity is considered ideal for streams or rivers that can sustain a minimum flow or those regulated by a lake or reservoir upstream. Run-of-the-river projects are dramatically different in design and appearance from conventional hydroelectric projects. Traditional hydroelectric dams store enormous quantities of water in reservoirs, sometimes flooding large tracts of land. In contrast, run-of-river projects do not have the disadvantages associated with reservoirs and so cause fewer environmental impacts. There have been no products available as original equipment or as an aftermarket to address this problem either.

There exists a need for a portable river turbine system that is not being met by any known or disclosed device or system of present.

SUMMARY OF THE INVENTION

The portable river turbine system is a small-scale electricity generator whereby boaters, fishers, or other individual entities can use the current of a river or other body of water to power or charge small electronic devices such as phones, lights, or radios. The detachable propeller or wheel is attached at one end of the waterproof turbine housing. The turbine can be secured by the side bolting, by the vertical hook, or optionally by both. Said vertical hook has a telescopic expandable shaft, allowing for the shaft to be the optimal length to best submerge the turbine wheel or propeller and still attach to a boat, dock, or other surface above the water's level. Stationed on the top of the waterproof turbine housing are quick connections that can be used for wires and handles.

The disclosed portable turbine device includes a turbine housing having a mounting bracket and a wire connecting point. The device also includes a propeller attached to a shaft of the turbine, the propeller configured to turn the shaft in response to a water current relative to the turbine housing. The device additionally includes a telescopic mount configured to attach to the turbine housing and enable a relative stationary submersion of the device underwater. The device further includes wires configured to connect a power generated from the turbine to an external device via the telescopic mount.

Figure 1:
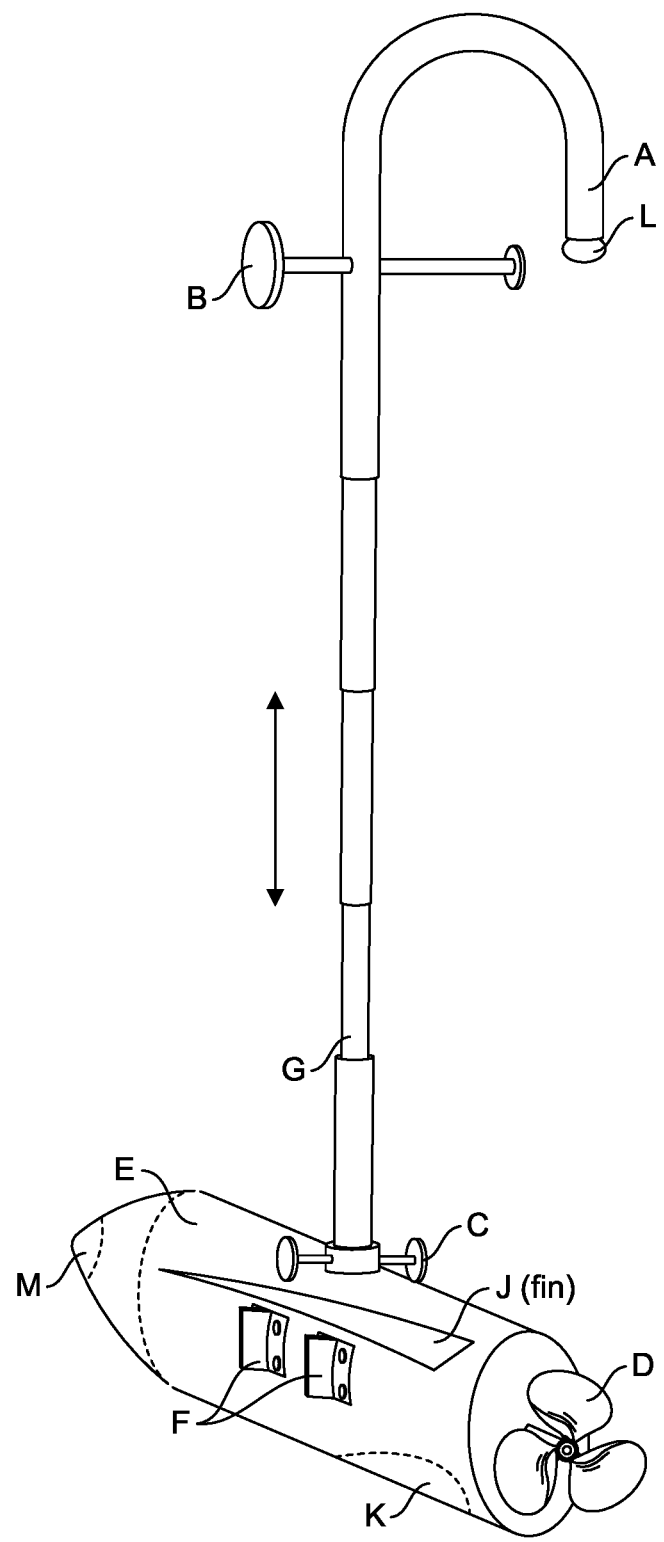
FIG. 1 is a view of the portable river turbine system, displaying the telescopic expandable shaft at full length in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure the term [term] is used to refer to [describe, rest of sentence]. The term [term] refers to [describe, rest of sentence].

FIG. 1 is a view of the portable river turbine system, displaying the telescopic expandable shaft at full length in accordance with an embodiment of the present disclosure. The system is held above the water current primarily by means of a telescopic mount G, and the attaching hook A. On said shaft, there is a tightening screw B to fix the shaft's length. The entire shaft is attached to the river turbine housing E. At the connection point, there are connection points for wires and handles C. The water-proof river turbine has a detachable propeller or wheel D to power it, and has brackets F to allow for bolting the turbine in a specific location. Additionally, at least one fin J, a ballast K and a control and regulator circuit M is included. An optional stopper L is disposed in the telescoping mount G to prevent water from entering a conduit define therein.

Figure 2:
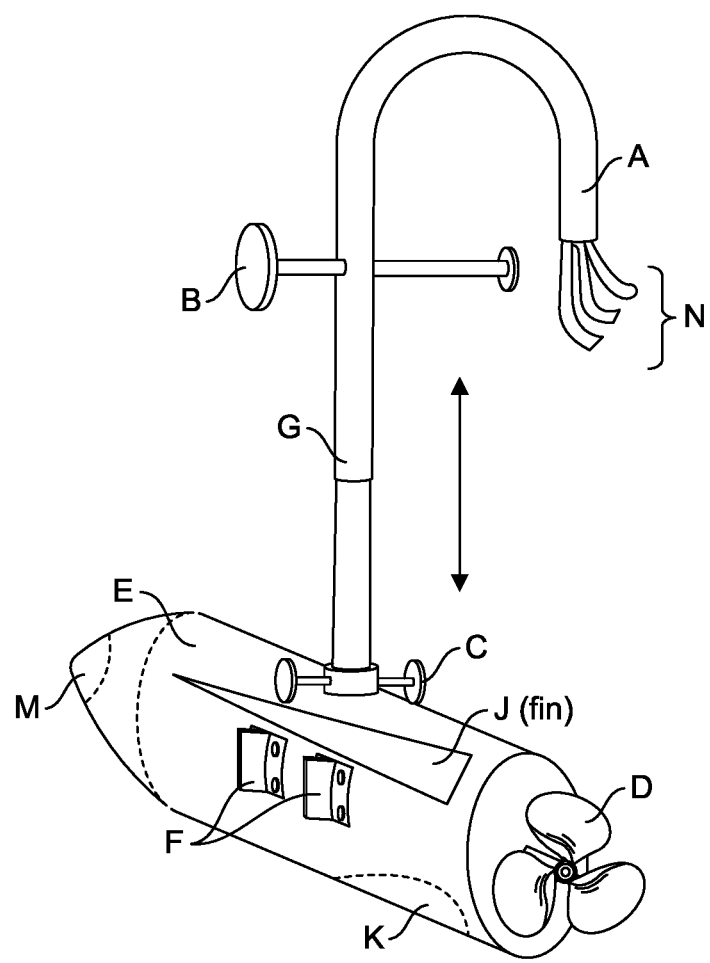
FIG. 2 is a view of the portable river turbine system, displaying the telescopic expandable shaft at minimum length in accordance with an embodiment of the present disclosure.

FIG. 2 is a view of the portable river turbine system, displaying the telescopic expandable shaft at minimum length in accordance with an embodiment of the present disclosure. The system is held above the water current primarily by means of a telescopic mount G, and the attaching hook A. On said shaft, there is a tightening screw B to fix the shaft's length. The entire shaft is attached to the river turbine housing E. At the connection point, there are connection points for wires and handles C. The water-proof river turbine has a detachable propeller or wheel D to power it, and has brackets F to allow for bolting the turbine in a specific location. In addition to the reference letters and similar limitations common with FIG. 1, the wires N include power and ground wires and at least one control wire for communicating and controlling the portable turbine device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A portable turbine device portable to an external device and comprising:
   a turbine housing having a mounting bracket and a wire connecting point;
   a propeller attached to the turbine housing, the propeller configured to turn in response to a water current relative to the turbine housing;
   a telescopic mount configured to attach to the turbine housing and enable a relative stationary submersion of the device under a water;
   wherein the telescopic mount comprises a shepherd's crook end for a gravity mounting of the device above the water submersing the device; and
   a plurality of wires configured to connect a power generated from the turbine to the external device via the telescopic mount.

2. The device of claim 1, wherein the telescopic mount is a conduit for a plurality of wires there through to the wire connecting point.

3. The device of claim 1, wherein the turbine housing and the telescopic mount are waterproof to the water current.

4. The device of claim 1, wherein the mounting bracket is adjacent the turbine housing.

5. The device of claim 1, wherein the telescopic mount enables a mounting of the device to a relative stationary device including a boat.

6. The device of claim 1, wherein the telescopic mount includes a tightening screw for fixing the telescopic shaft to a desired length.

7. The device of claim 1, wherein the telescopic mount is flexible and configured to enable the device to be trolled behind a boat.

8. The device of claim 1, wherein the telescopic mount is rigid and configured to be mounted to a dock.

9. The device of claim 1, further comprising a ballast configured to fill with a water from the water current and enable a submersion of the device therein.

10. The device of claim 1, wherein the turbine housing is torpedo shaped.

11. The device of claim 1, wherein the turbine housing comprises a cone shaped bow end.

12. The device of claim 1, wherein the propeller is adjacent an aft of the turbine housing.

13. The device of claim 1, further comprising at least one fin on the turbine housing.

14. The device of claim 1, wherein the plurality of wires comprises a power transfer wire and a ground wire and at least one control wire.

15. The device of claim 1, further comprising a voltage regulator for a voltage generated by the portable turbine device.

16. The device of claim 1, further comprising a circuit to monitor and control a voltage and a current generated by the portable turbine device.

* * * * *